United States Patent [19]

Furuya et al.

[11] Patent Number: 5,316,114

[45] Date of Patent: May 31, 1994

[54] DAMPING FORCE CONTROL TYPE HYDRAULIC SHOCK ABSORBER

[75] Inventors: Akihiro Furuya; Kinya Matsumoto, both of Kanagawa, Japan

[73] Assignee: Tokico Ltd., Kanagawa, Japan

[21] Appl. No.: 135,426

[22] Filed: Oct. 12, 1993

Related U.S. Application Data

[63] Continuation of Ser. No. 944,441, Sep. 14, 1992, abandoned.

[30] Foreign Application Priority Data

Sep. 20, 1991 [JP] Japan ................................. 3-268943

[51] Int. Cl.⁵ ............................................... F16F 9/44
[52] U.S. Cl. .................................. 188/299; 137/625.3; 188/322.15; 188/319
[58] Field of Search .................... 188/319, 299, 322.15, 188/322.22, 318, 281, 282; 251/207, 209; 280/707, 714; 137/625.3, 625.32

[56] References Cited

U.S. PATENT DOCUMENTS

| | | | |
|---|---|---|---|
| 4,754,855 | 7/1988 | Kuwana et al. | 188/299 |
| 4,765,446 | 8/1988 | Murata et al. | 188/322.15 X |
| 4,800,994 | 1/1989 | Imaizumi et al. | 188/299 X |
| 4,997,068 | 3/1991 | Ashiba | 188/299 X |
| 5,248,014 | 9/1993 | Ashiba | 188/319 |

FOREIGN PATENT DOCUMENTS

| | | | |
|---|---|---|---|
| 186908 | 7/1986 | European Pat. Off. | 188/319 |
| 58-84241 | 5/1983 | Japan . | |
| 255734 | 10/1989 | Japan | 188/319 |
| 51549 | 3/1991 | Japan | 188/299 |

Primary Examiner—Douglas C. Butler
Attorney, Agent, or Firm—Wenderoth, Lind & Ponack

[57] ABSTRACT

A damping force control type hydraulic shock absorber capable of providing different damping force characteristics during the extension and retraction strokes when the piston speed is low. The hydraulic shock absorber has a piston having a first damping force generating mechanism. A bypass passage is formed in part by small orifice passages and an extension-side damping force generating mechanism. The bypass passage is further provided with large orifice passages (constituting a passage with relatively large cross-sectional area) and medium orifice passages (with a medium cross-sectional area). When all the orifice passages are closed with a shutter, "hard" characteristics are obtained by the first damping force generating mechanism. When the shutter is opened, "medium" characteristics are obtained by the cooperation of the extension-side damping force generating mechanism and the medium orifice passages, which come into effect during the retraction stroke. When the large and small orifice passages are opened, "soft" characteristics are obtained by the cooperation of the small orifice passages, which come into effect during the extension stroke and the large orifice passages, which come into effect during the contraction stroke.

4 Claims, 3 Drawing Sheets

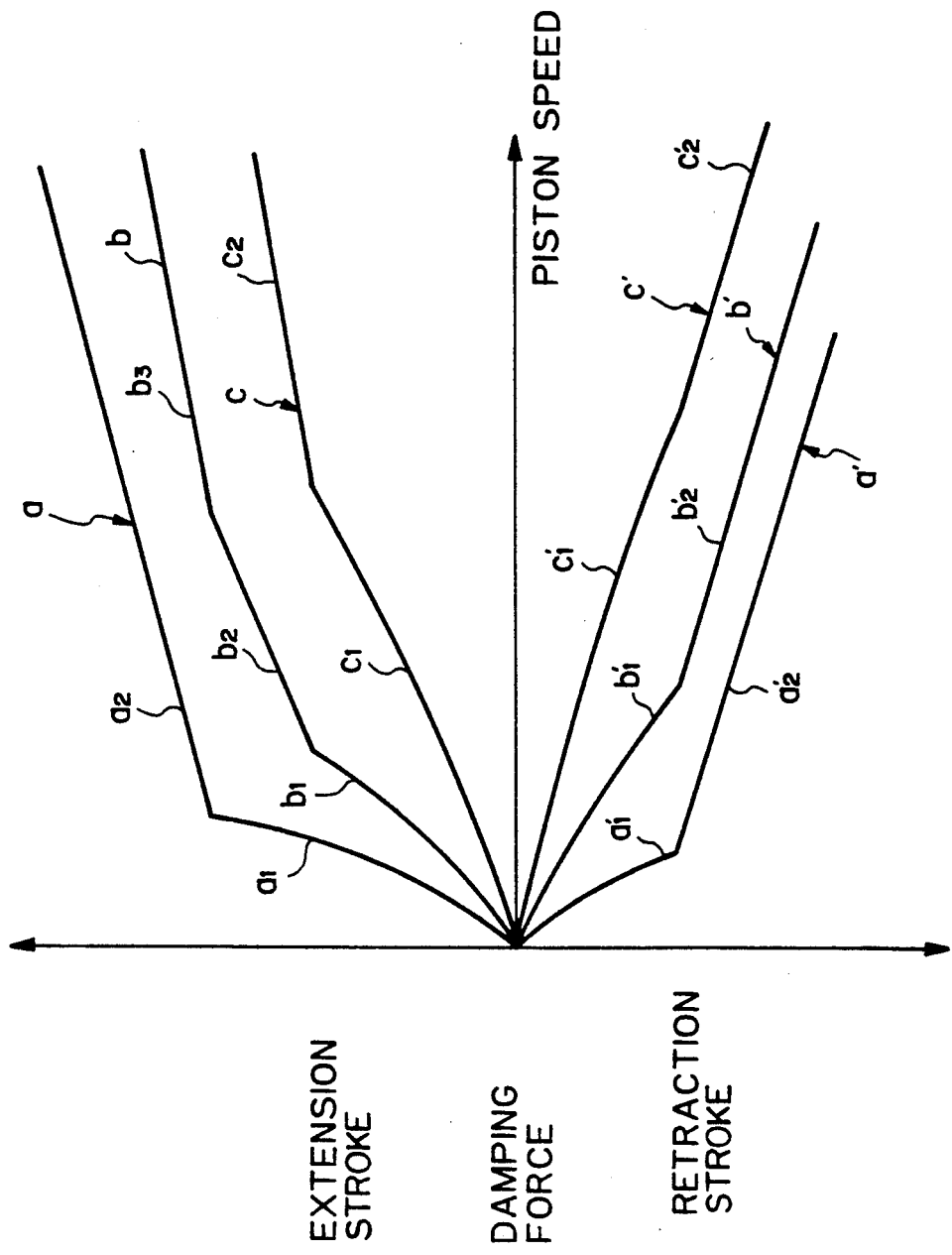

DAMPING FORCE CONTROL TYPE HYDRAULIC SHOCK ABSORBER

This application is a continuation of patent application Ser. No. 07/944,441 filed Sep. 14, 1992 and now abandoned.

BACKGROUND OF THE INVENTION

1. Field of the Invention

The present invention relates to a damping force control type hydraulic shock absorber for use in a suspension system of a vehicle, for example, an automobile.

2. Description of the Prior Art

Hydraulic shock absorbers for use in a suspension system of an automobile or other vehicle include damping force control type hydraulic shock absorbers which are designed so that the level of a damping force can be controlled properly in accordance with the road surface conditions, vehicle running conditions, etc., thereby making the vehicle even more comfortable to ride in and improving the steering stability.

Japanese Patent Application Public Disclosure (KOKAI) No. 58-84241 (1983) discloses one example of the conventional hydraulic shock absorbers of the type described above. The disclosed hydraulic shock absorber includes a cylinder having a hydraulic fluid sealed therein, and a piston slidably fitted in the cylinder to divide the inside of the cylinder into two chambers. The prior art further includes a first damping force generating mechanism, a second damping force generating mechanism, and a variable orifice (which can be opened and closed as desired), which are provided in parallel to provide communication between the two chambers in the cylinder. In addition, a switching valve is provided for selectively opening and closing a hydraulic fluid passage of the second damping force generating mechanism.

With the above arrangement, when both the variable orifice and the switching valve are open, small damping force characteristics ("soft" characteristics) are obtained since the fluid flows through the first and second damping force generating mechanisms and the variable orifice; when the variable orifice is closed with the switching valve open, medium damping force characteristics ("medium" characteristics) are obtained since the fluid flows through the first and second damping force generating mechanisms; and when both the variable orifice and the switching valve are closed, large damping force characteristics ("hard" characteristics) are obtained by the fluid flowing through the first damping force generating mechanism alone.

The above-described conventional damping force control type hydraulic shock absorber suffers, however, from the problems stated below. Since a combination of a disk valve and an orifice is employed for each of the extension and retraction sides of the second damping force generating mechanism, when the piston speed is low and hence the disk valve is closed, a damping force is generated by the same orifice for both the extension and retraction strokes. Accordingly, when both the variable orifice and the switching valve are open (i.e., in the "soft" characteristic mode) and, at the same time, the piston speed is low, the same level of damping force is generated a for both the extension and retraction strokes by the cooperation of the variable orifice and the orifice of the second damping force generating mechanism. When the variable orifice is closed with the switching valve open (i.e., in the "medium" characteristic mode) and, at the same time, the piston speed is low, the same level of damping force is generated for both the extension and retraction strokes by the orifice of the second damping force generating mechanism. Thus, when the piston speed is low in either the "soft" or "medium" characteristic mode, the damping force characteristics obtained during the extension and retraction strokes are the same, which makes it difficult to obtain proper damping force characteristics for each particular purpose.

SUMMARY OF THE INVENTION

In view of the above-described circumstances, it is an object of the present invention to provide a damping force control type hydraulic shock absorber which is capable of providing different damping force characteristics for the extension and retraction strokes even when the piston speed is low.

To this end, the present invention provides a damping force control type hydraulic shock absorber comprising: a cylinder having a hydraulic fluid sealed therein; a piston slidably fitted in the cylinder to divide the inside of the cylinder into two chambers; a piston rod which is connected at one end thereof to the piston and the other end of which projects from the cylinder; a first damping force generating mechanism provided on the piston to generate a damping force during both extension and retraction strokes of the piston rod; a bypass passage having a portion extending in the piston rod to provide communication between the two chambers; a second damping force generating mechanism provided in the bypass passage and arranged such that during the extension stroke it restricts the flow of the hydraulic fluid in the bypass passage so as to generate a damping force, whereas during the retraction stroke it allows the hydraulic fluid to pass through the bypass passage without encountering resistance; first orifice means provided in the bypass passage in series to the second damping force generating mechanism; a first shutter for selectively opening and closing the first orifice means; and an auxiliary bypass passage communicating with the bypass passage in parallel with the second damping force generating mechanism and having therein second orifice means. The second orifice means has a smaller cross-sectional area than that of the first orifice means. A second shutter is also provided for selectivity opening and closing the second orifice means.

By virtue of the above-described arrangement, when the first and second orifice means are closed, a large damping force is generated by the first damping force generating mechanism during both the extension and contraction strokes. When the first orifice means is opened with the second orifice means closed, the hydraulic fluid in the cylinder passes through the byass passage in response to the movement of the piston, so that when the piston speed is low, during the extension stroke, a damping force is generated by the second damping force generating mechanism, whereas during the retraction stroke, damping force which is smaller than that generated during the extension stroke is generated by the first orifice means because there is no flow resistance provided by the second damping force generating mechanism. When both the first and second orifice means are opened, the hydraulic fluid in the cylinder passes through the bypass passage in response to the movement of the piston, so that when the piston speed is low, during the extension stroke, a small damping force is generated by the cooperation of the second orifice means and the second damping force generating mechanism, whereas during the contraction stroke, damping force which is smaller than that generated during the extension stroke is generated by the first orifice means because there is no flow resistance provided by the second damping force generating mechanism.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIG. 4 is a graph showing damping force characteristics of the hydraulic shock absorber of the present invention shown in FIG. 1.

DETAILED DESCRIPTION OF THE PREFERRED EMBODIMENTS

One embodiment of the present invention will be described below in detail with reference to the accompanying drawings.

Figure 1:
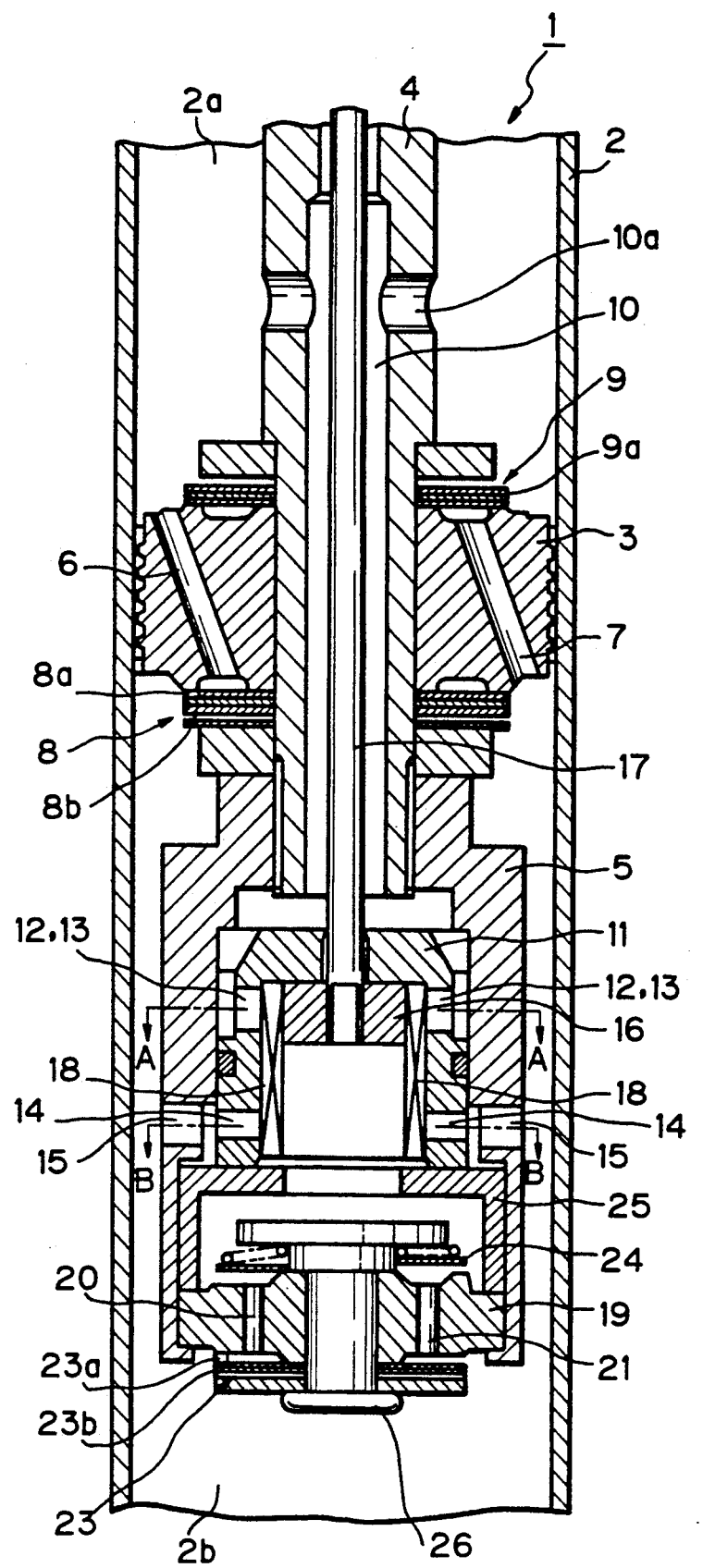
FIG. 1 is a vertical sectional view of an essential part of one embodiment of the damping force control type hydraulic shock absorber according to the present invention.

Referring to FIG. 1, a damping force control type hydraulic shock absorber 1 of the present invention includes a cylinder 2 having a hydraulic fluid sealed therein, and a piston 3 which is slidably fitted in the cylinder 2 to divide the inside of the cylinder 2 into two chambers, i.e., a cylinder upper chamber 2a and a cylinder lower chamber 2b. The piston 3 has a hole through which the proximal end portion of a piston rod 4 extends. The distal end portion of the rod 4 extends as far as the outside of the cylinder 2. The piston rod 4 has a cylindrical passage member 5 screwed onto the proximal end portion thereof so as to be connected to the piston 3. The cylinder 2 is provided with a reservoir chamber (not shown) for compensating for a change in the amount of hydraulic fluid in the cylinder 2 that corresponds to the amount by which the piston rod 4 enters or withdraws from the cylinder 2.

The piston 3 is provided with an extension-side main hydraulic fluid passage 6 and a retraction-side main hydraulic fluid passage 7, which provide communication between the cylinder upper and lower chambers 2a and 2b. The end face of the piston 3 that is closer to the cylinder lower chamber 2b is provided with a damping force generating mechanism 8 comprising an orifice 8a and disk valves 8b, which cooperate with each other to generate a damping force during the extension and retraction strokes. The end face of the piston 3 that is closer to the cylinder upper chamber 2a is provided with a retraction-side damping force generating mechanism 9 comprising disk valves 9a. The damping force generating mechanisms 8 and 9 constitute a first damping force generating mechanism.

The piston rod 4 is provided with a hydraulic fluid passage 10 that opens at one end thereof into the cylinder upper chamber 2a through openings 10a and at the other end thereof into the passage member 5 at the cylinder lower chamber side. The hydraulic fluid passage 10 and the passage member 5 constitute a bypass passage that provides communication between the cylinder upper and lower chambers 2a and 2b.

The passage member 5 is fitted with a guide member 11 the upper end of which is closed. The side wall of the upper end portion of the guide member 11 is provided with a pair of relatively large orifice passages 12 (with a relatively large passage area) and a pair of relatively small orifice passages 13 (with a medium passage area), which are disposed as shown in FIG. 2 to constitute in combination first orifice means, thereby providing communication between the hydraulic fluid passage 10 and the cylinder lower chamber 2b through the inside of the passage member 5. The side wall of the lower (open) end portion of the guide member 11 is provided with orifice passages 14 (with a relatively small passage area) which are disposed as shown in FIG. 3 to constitute second orifice means. The orifice passages 14 communicate with the cylinder lower chamber 2b through an auxiliary bypass passage including bores 15 provided in the side wall of the passage member 5. The respective passage areas of the orifice passages 12, 13 and 14 are set so that when both the first and second orifice means are opened by a shutter (described later), the flow path area of the second orifice means (the total cross-sectional area of the orifice passages 14 when open) is always smaller than that of the first orifice means.

Figure 2A:
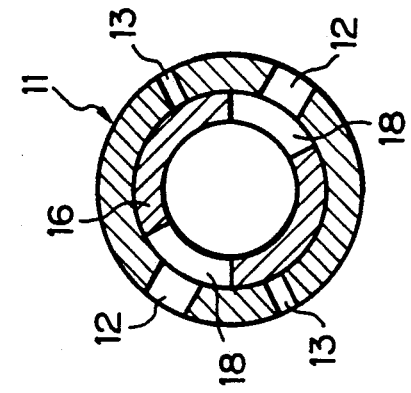
FIGS. 2(a), 2(b) and 2(c) are each a sectional view taken along the line A—A in FIG. 1, showing a guide member and a shutter which are employed in the hydraulic shock absorber of the present invention.
Figure 2B:
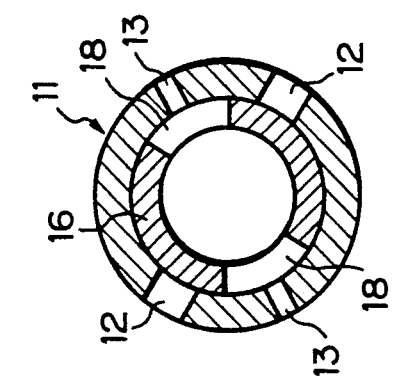
Figure 2C:
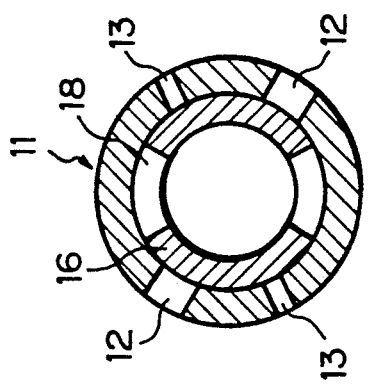
Figure 3A:
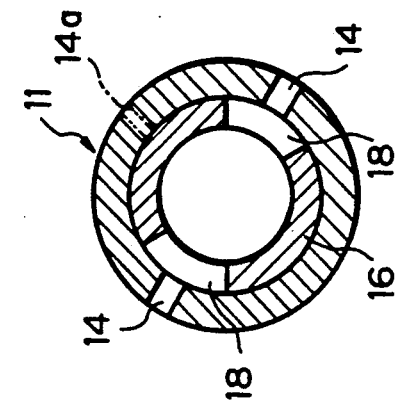
FIGS. 3(a), 3(b) and 3(c) are each a sectional view taken along the line B—B in FIG. 1, also showing the guide member and the shutter in the hydraulic shock absorber of the present invention.
Figure 3B:
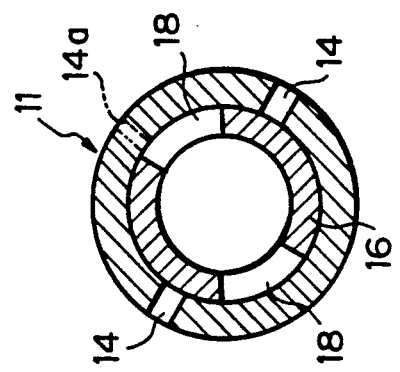
Figure 3C:
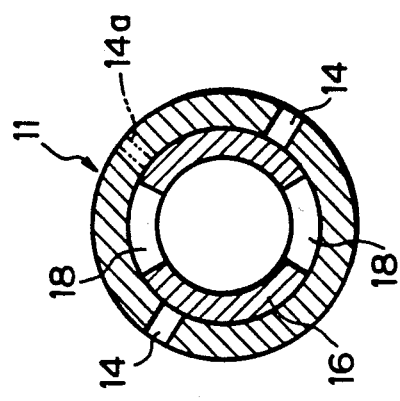

First and second shutters are provided for the first and second orifice means. In the illustrated embodiment, they are in the form of a one piece tubular shutter 16. The tubular shutter 16, the upper end of which is closed but the lower end of which is open, is rotatably fitted in the guide member 11 to serve as both first and second shutters. The shutter 16 can be controlled from the outside of the distal end portion of the piston rod 4 through a rod 17 which is connected to the upper end portion of the shutter 16 and which extends along the piston rod 4. The side wall of the shutter 16 is provided with cut portions 18 which are disposed as shown in FIGS. 2 and 3, so that the orifice passages 12, 13 and 14 are selectively opened and closed according to whether or not the cut portions 18 are aligned with the orifice passages 12, 13 and 14. When the shutter 16 is in the position shown in FIGS. 2(a) and 3(a), the orifice passages 12, 13 and 14 are closed; when it is in the position shown in FIGS. 2(B) and 3(B), the orifice passages 12 and 14 are closed, while the orifice passages 13 are open; and when it is in the position shown in FIGS. 2(c) and 3(c), the orifice passages 13 are closed, while the orifice passages 12 and 14 are open.

A partition member 19 is provided in the opening at the lower end of the passage member 5 to partition off the inside of the passage member 5 from the cylinder lower chamber 2b. The partition member 19 is provided with an extension-side hydraulic fluid passage 20 and a retraction-side hydraulic fluid passage 21, which provide communication between the inside of the passage member 5 and the cylinder lower chamber 2b. The end face of the partition member 19 that is closer to the cylinder lower chamber 2b is provided with a damping force generating mechanism 23 comprising an orifice 23a and disk valves 23b, which control the flow of hydraulic fluid in the extension-side hydraulic fluid passage 20 during the extension stroke to thereby generate a damping force. The end face of the partition member 19 that is disposed inside the passage member 5 is provided with a check valve 24 which allows hydraulic fluid to flow into the passage member 5 from the cylinder lower chamber 2b through the retraction-side hydraulic fluid passage 21 but prevents the flow of hydraulic fluid from the passage member 5 to the cylinder lower chamber 2b. The damping force generating mechanism 23 and the check valve 24 constitute a second damping force generating mechanism. Accordingly, the orifice passages 14 and the second damping force generating mechanism are disposed in parallel to each other in the by passage. It should be noted that the damping force generating mechanism 23 is set so as to generate smaller damping force than the damping force generated by the damping force generating mechanism 8 provided in the piston section. In FIG. 1, reference numeral 25 denotes a spacer for positioning the guide member 11 and the partition member 19, and 26 a pin for attaching the damping force generating mechanism 23 and the check valve 24 to the partition member 19.

The operation of this embodiment, arranged as described above, will be explained below. When the shutter 16 is placed in the position shown in FIGS. 2(a) and 3(a) by actuating the rod 17 (i.e., in the case of "hard" characteristics), the orifice passages 12, 13 and 14 are closed. Accordingly, during both the extension and retraction strokes, when the piston speed is low, the hydraulic fluid moves between the cylinder upper and lower chambers 2a and 2b through the orifice 8a, thus generating a damping force having characteristics dictated by the orifice as shown by the curves $a_1$ and $a'_1$ in FIG. 4. When the piston speed increases, a relatively large damping force is generated by the disk valves 8b or 9a, thus providing a damping force having characteristics dictated by the valves as shown by the curves $a_2$ and $a'_2$ in FIG. 4.

When the shutter 16 is placed in the position shown in FIGS. 2(b) and 3(b) (i.e., in the case of "medium" characteristics), the orifice passages 13 (with a medium passage area), which constitute the first orifice means, are open, while the orifice passages 12 and 14 are closed. Accordingly, during the extension stroke, when the piston speed is low, the hydraulic fluid in the cylinder upper chamber 2a flows into the cylinder lower chamber 2b through the orifice 8a in the piston section and the orifice passages 13 in the bypass passage and through the orifice 23a. At this time, a damping force is generated by the orifices 8a and 23a, the damping force having characteristics shown by the curve $b_1$ in FIG. 4. When the piston speed increases, the disk valves 23b of the second damping force generating mechanism are opened, thus generating a damping force having characteristics dictated by the valve as shown by the curve $b_2$ in FIG. 4. When the piston speed further increases, the disk valves 8b in the pistion section are opened, thus providing a damping force having characteristics shown by the curve $b_3$ in FIG. 4.

During the retraction stroke, when the piston speed is low, the hydraulic fluid passes through the orifice 8a in the piston section in the same way as in the extension stroke. In addition, the check valve 24 is opened, so that the hydraulic fluid flows through the bypass passage via the orifice passages 13. At this time, the orifice 8a and the orifice passages 13 cooperate with each other to generate a damping force having characteristics shown by the curve $b'_1$ in FIG. 4. When the piston speed increases, the disk valves 9a in the piston section are opened, thus providing a damping force having characteristics shown by the curve $b'_2$ in FIG. 4.

When the shutter 16 is placed in the position shown in FIGS. 2(c) and 3(c) (i.e., in the case of "soft" characteristics), the orifice passages 12 (with a large passage area) as the first orifice means and the orifice passages 14 (with a small passage area) as the second orifice means are open, while the orifice passages 13 are closed. At this time, since the passage (total cross-sectional) area of the orifice passages 14 is smaller than that of the orifice passages 12, the cross-sectional area of the flow path of the second orifice means is smaller than that of the first orifice means.

Accordingly, during the extension stroke, when the piston speed is low, the hydraulic fluid in the cylinder upper chamber 2a flows into the cylinder lower chamber 2b through the orifice 8a in the piston section and the orifice passages 12 and 14 in the bypass passage. At this time, the orifice 8a and the orifice passages 14 cooperate with each other to generate a damping force having characteristics shown by the curve $c_1$ in FIG. 4. When the piston speed increases, the disk valves 23b of the second damping force generating mechanism are opened, thus generating a damping force having characteristics dictated by the valve as shown by the curve $c_2$ in FIG. 4.

During the retraction stroke, when the piston speed is low, the hydraulic fluid passes through the orifice 8a in the piston section in the same way as in the extension stroke. In addition, the check valve 24 is opened, so that the hydraulic fluid flows through the bypass passage via the orifice passages 12. At this time, the orifice 8a and the orifice passages 12 cooperate with each other to generate a damping force having characteristics shown by the curve $c'_1$ in FIG. 4. When the piston speed increases, the disk valves 9a in the piston section are opened, thus providing a damping force having shown by the curve $c'_2$ in FIG. 4.

Thus, when the piston speed is low in the "medium" or "soft" characteristic mode, the hydraulic fluid passages in the second damping force generating mechanism are switched over so as to generate different levels of damping force during the extension and retraction strokes.

It should be noted that an orifice passage 14a having a smaller passage area than that of the orifice passages 13 may be additionally provided in the guide member 11, as shown by the two-dot chain line in FIG. 3, so that part of the hydraulic fluid flowing through the bypass passage passes through the orifice passage 14a in the "medium" characteristic mode.

As has been described in detail above, the damping force control type hydraulic shock absorber of the present invention selectively produces three damping force characteristics: large damping force characteristics provided by the first damping force generating mechanism; medium damping force characteristics provided by the cooperation of the first orifice means and the second damping force generating mechanism; and small damping force characteristics provided by the cooperation of the first orifice means, the second damping force generating mechanism and the second orifice means that is disposed in parallel to the second damping force generating mechanism. In addition, since the second a damping force generating mechanism generates damping force during the extension stroke but offers no flow resistance during the retraction stroke, when the medium or small damping force characteristics are selected, different levels of damping force are generated during the extension and contraction strokes, respectively, which results in enlargement of the range within which the damping force characteristics can be controlled. Thus, it becomes easy to set proper damping force characteristics for each particular purpose.

Although the present invention has been described through specific terms, it should be noted here that the described embodiment is not necessarily exclusive.

For instance, although the first and second shutters are formed by the one piece member 16 in the embodiment, they may be formed by separate members. Since the main function of the first shutter is to open and close the bypass passage, it may be provided in the vicinity of the openings 10a so as to open and close them depending on the rotational position of the rod 17. Each of the orifice passages 12, 13 and 14 may be formed by a slot extending circumferentially so that its flow passage area gradually varies upon rotation of the shutter 16. The slot may taper in the circumferential direction. Furthermore, the bores 15 may be replaced with orifice passages while the orifice passages 14 may be replaced with bores which provide substantially no resistance to the flow therethrough.

What is claimed is:

1. A damping force control type hydraulic shock absorber comprising:
    a cylinder having a hydraulic fluid sealed therein;
    a piston slidably fitted in said cylinder and dividing the interior of said cylinder into upper and lower chambers;
    a piston rod connected at one end thereof to said piston and extending through said upper chamber so as to have the other end project from said cylinder;
    a first damping force generating mechanism provided on said piston and which generates a damping force during both extension and retraction strokes of said piston rod in which the piston rod is extended from and retracted into the cylinder, respectively;
    a bypass passage placing said two chambers in communication, a portion of said bypass passages extending in said piston;
    a second damping force generating mechanism provided in said bypass passage and including a disk valve which opens to a degree depending on the pressure of the hydraulic fluid applied thereto during the extension stroke to vary a flow path area and a check valve which allows the hydraulic fluid to pass through the bypass passage during the retraction stroke without the fluid encountering substantial resistance;
    first orifice means provided in said bypass passage between said upper chamber and said second damping generating mechanism and in series with said second damping force generating mechanism;
    a first shutter actuatable between respective positions at which the first orifice means is closed and open, a first flow path for hydraulic fluid being formed when the first orifice means is in one open position thereof and a second flow path for hydraulic fluid being formed when the first orifice means is in another open position thereof, the cross-sectional area of said second flow path being larger than that of said first flow path;
    an auxiliary bypass passage communicating with said bypass passage at a location between said first orifice means and said second damping force generating mechanism and open to said lower chamber, said auxiliary bypass passage including second orifice means, said second orifice means being the only means in the auxiliary bypass passage or restricting the flow of fluid through the auxiliary bypass passage to generate a damping force;
    a second shutter actuatable to place said second orifice means in a first state wherein the second orifice means is open to form a first flow path for hydraulic fluid having a cross-sectional area smaller than that of said second flow path, and a second state wherein the second orifice means is closed or provides a second flow path for hydraulic fluid having a cross-sectional area smaller than that of said first flow path formed when said second orifice means is in the first state and also smaller than that of said first flow path; and
    means for actuating said first and second shutters to selectively assume a first position wherein said first orifice means is closed and said second orifice means is in said second state, a second position wherein said first orifice means is in said one open position thereof and said second orifice means assumes said second state, and a third position wherein said second orifice means assumes said first state and said first orifice means is in another said open position thereof.

2. A damping force control type hydraulic shock absorber according to claim 1, wherein said bypass passage is blocked when said first orifice means is closed and said second orifice means is in said second state such that said second damping force generating mechanism is rendered inoperative in generating a damping force during the extension stroke when said shutters assume said first position, wherein said bypass passage is open between said chambers when said first orifice means is open and said second orifice means is in said second state such that said first and said second damping force generating mechanisms are operative to generate damping forces during the extension stroke when said shutters assume said second position while the first damping force generating mechanism and said first orifice means cooperate to generate a damping force during the retraction stroke when said shutters assume said second position, said first and said second damping force generating mechanisms and said second orifice means cooperating to generate a damping force during the extension stroke when said shutters assume said third position, and said first damping force generating mechanism and said first orifice means cooperating to generate a damping force during the retraction stroke when said shutters assume said third position.

3. A damping force control type hydraulic shock absorber according to claim 1, wherein said first orifice means comprises a plurality of orifices, and said first shutter selectively opens and closes said plurality of orifices.

4. A damping force control type hydraulic shock absorber according to claim 1, wherein said second orifice means comprises a plurality of orifices, and said second shutter selectively opens and closes said plurality of orifices.

* * * * *